J. W. MARTIN
Weighing Cart.

No. 21,999.

Patented Nov. 2, 1858.

UNITED STATES PATENT OFFICE.

JAMES W. MARTIN, OF PHILADELPHIA, PENNSYLVANIA, ASSIGNOR TO LEWIS ROTHERMEL, OF SAME PLACE.

WEIGHING-CART.

Specification of Letters Patent No. 21,999, dated November 2, 1858.

*To all whom it may concern:*

Be it known that I, JAMES W. MARTIN, of Philadelphia, in the county of Philadelphia and State of Pennsylvania, have invented a new and useful Improvement in Weighing-Carts; and I do hereby declare that the following is a full, clear, and exact description of the same, reference being had to the annexed drawings, making a part of this specification, in which—

Figure 1:
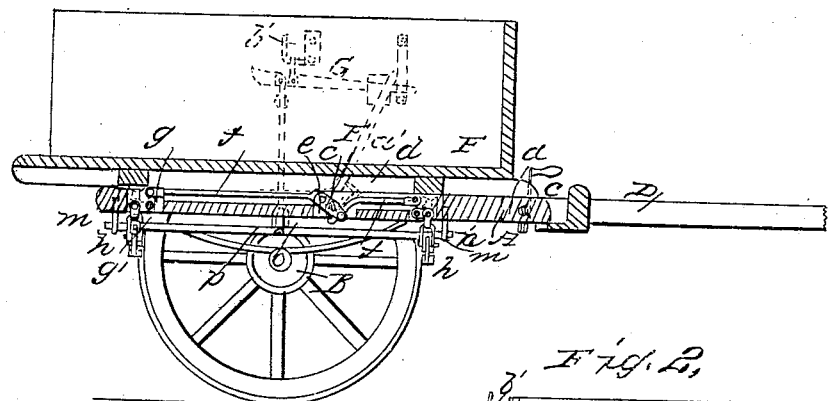
Figure 2:
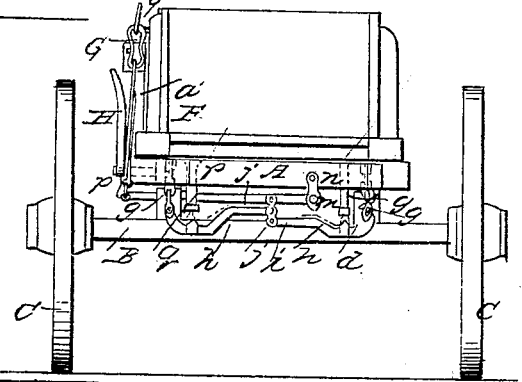
Figure 3:
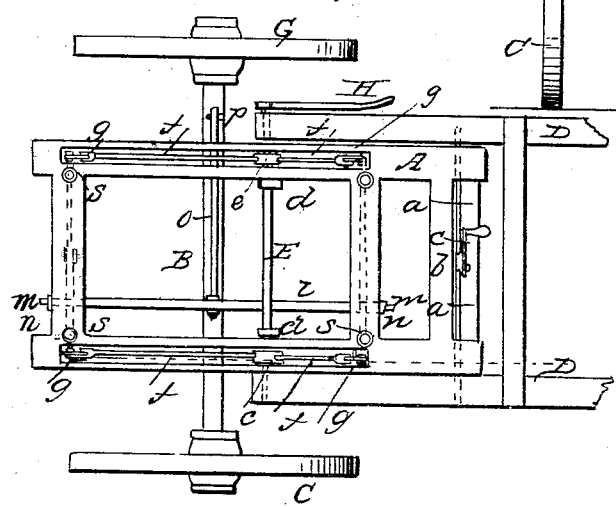

Figure 1, is a longitudinal vertical section of a cart with my invention applied to it taken in the line $x$, $x$, Fig. 3. Fig. 2 is a back view of ditto. Fig. 3, is a top or plan view of the bed of the cart the body being detached.

Similar letters of reference indicate corresponding parts in the several figures.

This invention relates to an improvement on a weighing cart which was patented by me May 20, 1856.

The device is intended for weighing loads previously to being dumped so that a purchaser can ascertain the weight of the article bought and thereby guard against the deceptions practiced by dishonest dealers or merchants.

The within described invention consists in an improved mechanism whereby the cart body may be firmly secured to its bed and also when necessary readily detached therefrom and elevated so as to be connected only with the scale beam for the purpose of having the load weighed.

To enable those skilled in the art to fully understand and construct my invention, I will proceed to describe it.

A, represents the cart bed which is a rectangular frame attached permanently to an axle B, provided with the usual wheels C, C.

D, are the thills the back ends of which are attached to the bed A, by a shaft or rod E, which passes transversely through the bed A and through the ends of the thills just in front of the axle B. The bed A is prevented from tilting casually by means of rods $a$, $a$, which are attached to the ends of a bar or button $b$, which is pivoted at its center to the front of the bed A and has a handle $c$, attached, the rods $a$, $a$, by operating the bar $b$, being pushed through the sides of the bed into the thills to secure the bed to the thills or withdrawn from the thills so as to allow the body to tilt. This will be understood by referring to Fig. 3.

On the shaft or rod E and within the frame which forms the cart bed A there, are permanently attached two hooks $d$, $d$, see Figs. 1 and 3, one near each side piece of the cart bed, and on the shaft E near each end an arm or bar $e$, is placed to each end of which rods $f$, are pivoted, the outer ends of said rods being attached by levers $g$, and links $g'$, to levers $h$, which are placed two at each end of the bed A and have knife-edged fulcra $i$, fitted in pendant bearings $j$, said bearings being suspended on knife-edged bearings $j$, from arms $k$, which project from a longitudinal shaft $l$, the ends of which are also provided with knife edged journals $m$, which fit in bearings $n$, attached to the front and back ends of the cart bed. The rods $f$, and bars $e$, are fitted in slots in the side pieces of the bed, as shown in Figs. 1 and 3, and to the shaft $l$ at about its center a rod $o$ is attached at right angles, said rod extending beyond the side of the bed and having an eye $p$, attached.

F is the cart body which may be constructed in the usual form. This body has four rods $q$, projecting down from its bottom—said rods being rigidly attached to the cart body and projecting down from it, one from near each corner. These rods $q$, have each an inverted conical shoulder $r$, at its upper end adjoining the bottom of the cart. In the bed A four openings are made in which metal thimbles $s$, are fitted, the upper ends of the thimbles being reamed out or made of flaring form corresponding with the shoulders $r$ of the rods $q$. The lower ends of the rods $q$, have each a head $t$, formed thereon. The rods $q$ pass through the thimbles $s$, and the heads $t$, rest or bear on knife-edged projectors $u$, on the levers when the body F, is raised, and the shoulders $r$ fit in the enlarged orifices of the thimbles $s$, when the body rests on the bed. The outer end of the rod $o$, is attached by a rod $a$, to a scale beam G of ordinary construction and attached to the body F as shown at $b$, see Fig. 2 and dotted lines in Fig. 1. To one end of the shaft E a lever H, is attached, said lever serving as a handle.

From the above description it will be seen that by turning the handle H, from left to right the hooks $d, d$, will catch over a rod $c^x$ at the bottom of the body F and firmly hold the same to the bed A the levers $h$, by the turning of the arms or bars $e$, which are attached to the shaft E descending so as to allow the body to fall. By turning the lever or handle H in the opposite direction—viz, from right to left, the hooks $d, d$, will pass off the rod $c^x$ and the arms $e$ will be actuating the rods $f$ raise the levers $h$, and the body F will be then supported by the levers $h$, which by the shaft $l$, and its arms $k$, is in direct connection with the scale beam G the body and its load being counterpoised by a weight on the scale beam and thereby weighed as usual. The bed and its body F are allowed to tilt at any time, by withdrawing the rods $a, a$, from the thrills D. By the within described invention a very simple and efficient mechanism is employed for connecting the body F with the bed A, and also for raising the body free from the bed so that it will be in connection with the scale beam. There are no parts liable to get out of repair, and the device may be constructed at a reasonable expense. The load also may be weighed when the body F is in an inclined position, the ends of the thrills resting on the ground, equally as well as if it were in a horizontal position.

I do not claim the application of a scale beam to a cart for the purpose specified for this has been formerly done, and may be seen in the device patented by me and formerly alluded to, but

Having thus described my invention what I claim as new and desire to secure by Letters Patent is—

The shaft E, provided with hooks $d, d$, and arms $e, e$, which are connected by rods $f, f$, with lever $h$, having their fulcra $i$, connected by pendents $j$, to the arms $k$, of a shaft $l$, which is connected with the scale beam G by the arm $o$, and rod $a$. The rods $g$, of the body resting on the lever $h$, when the latter raises the body—and the latter provided with the rod $c^x$ for the hooks $d$, to catch over, the whole being arranged substantially as and for the purpose set forth.

JAS. W. MARTIN.

Witnesses:
 CHARLES D. FREEMAN,
 HARRY S. LUKENS.